Feb. 5, 1946.    J. R. McCRAY    2,394,248
ADJUSTABLE WAGON HANDLE
Filed Nov. 27, 1944

INVENTOR.
Joseph R. McCray
BY Victor J. Evans & Co.
ATTORNEYS

Patented Feb. 5, 1946

2,394,248

UNITED STATES PATENT OFFICE 2,394,248

ADJUSTABLE WAGON HANDLE

Joseph Rudolph McCray, South Bend, Ind.

Application November 27, 1944, Serial No. 565,345

1 Claim. (Cl. 280—87.01)

The invention relates to adjustable handles, and more especially to adjustable play wagon handles.

The primary object of the invention is the provision of a handle of this character, wherein a play wagon having a guide and draft tongue equipped therewith, enables grown people to use such wagon for any required purposes, in that the said handle can be adjusted for the lengthening or shortening of the tongue, suiting it for service to the grown person or for use by a child, the handle when adjusted for extending the tongue and thereby adapting it for service by the grown person, will be unsuited for use by the child, thus the said handle through another adjustment can shorten the tongue, adapting it for the said child, either in the draft of the wagon or for coasting purposes.

Another object of the invention is the provision of a handle of this character, wherein the same is telescopically fitted to the tongue of the wagon for the lengthening or shortening of such tongue, in a novel and unique manner, thereby adapting the wagon for use by grown-ups or for children.

A further object of the invention is the provision of a handle of this character, wherein the adjustable fastening thereof assures safety, and permits adjustment to be had with ease and dispatch.

A still further object of the invention is the provision of a handle of this character, which is simple in construction, thoroughly reliable and efficient in its purpose, strong, durable, readily and easily adjusted with dispatch, neat in appearance, and inexpensive to manufacture and install.

With these and other objects in view, the invention consists in the features of construction, combination and arrangement of parts as will be hereinafter more fully described, illustrated in the accompanying drawing, which shows the preferred embodiment of the invention, and pointed out in the claim hereunto appended.

In the accompanying drawing—

Similar reference characters indicate corresponding parts throughout the several views in the drawing.

Figure 1:
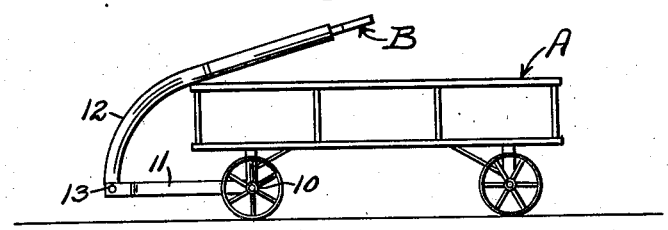
Figure 1 is a side view of a wagon showing the handle constructed in accordance with the invention applied to the tongue of such vehicle.
Figure 2:
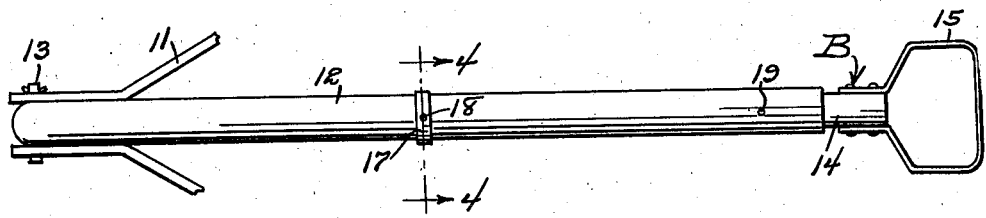
Figure 2 is a plan view of the handle and tongue, the handle being in one adjusted position.
Figure 3:
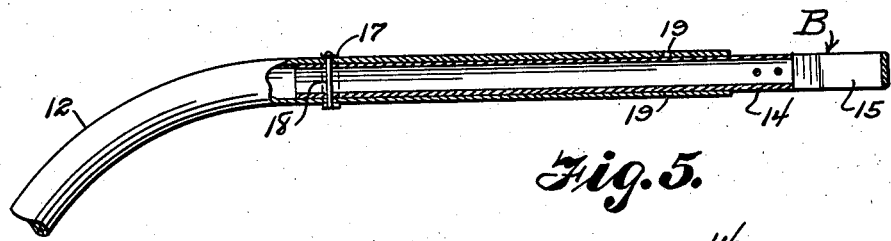
Figure 3 is a side view partly broken away of the structure shown in Figure 2.
Figure 5:
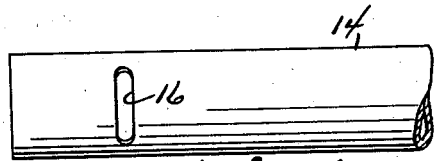
Figure 5 is a fragmentary side view of the tongue.
Figure 4:
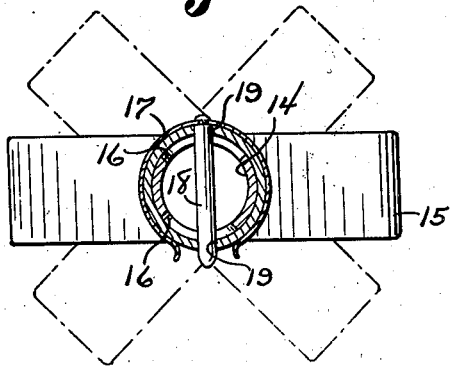
Figure 4 is a sectional view taken on the line 4—4 of Figure 2 looking in the direction of the arrows.
Figure 6:
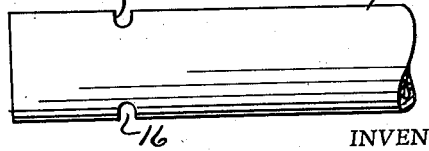
Figure 6 is a view similar to Figure 5 looking toward the top of the tongue.

Referring to the drawing in detail, A designates a wheeled play wagon, which is of any ordinary well known construction, having joined with the front steering axle 10 a forwardly extending tongue bracket or fixture 11, in which is fitted a vertically swinging tongue 12, the inner curved end portion of the latter being pivoted at 13 to the bracket or fixture, as is usual.

Adapted to be fitted in the outer end portion of the tongue 12, which is of tubular formation, is the handle denoted generally at B, constructed in accordance with the invention, and comprises a shank or stem 14 of any desired length as may be selected, and is of a cross-sectional size to telescopically fit and slide in the outer end portion of the tongue 12 for the lengthening or shortening thereof.

The stem or shank 14 at its outer end carries a loop-like handgrip 15, which is permanently fixed thereto in any suitable manner. The shank 14 is formed with opposed elongated slots 16 extending in a direction transversely of the stem, and the tongue 12 is formed with spaced apart opposed openings 19 preferably one opposed pair of openings 19 being located close to the outer extremity of the outer end portion of such tongue, while the other opposed pair of openings 19 is located inwardly remote from the inner end thereof and the pair of slots 16 is located inwardly of that end of the shank or stem 14 that is opposite the end to which the handle 15 is attached.

Engageable over the shank or stem 14 is a detachable split inherently resilient or springy locking collar, ring or the like 17, having centrally of its closed side a latching pin or tine 18, which is insertable in spaced holes or openings 19 and susceptible of registry with the opposed slots 16, and in this manner the said stem or shank 14 is adjustably latched to the tongue 12, and also is capable of slight turning movements, limited by the elongated formations of the said slots 16, which receive the pin or tine 18. Thus it can be seen that the tongue 12 in association therewith of the handle B under adjustment of the latter enables a lengthening and shortening relationship thereof.

When the tongue with the handle is lengthened, the wagon is serviceable for grown-ups and on shortening adjustment, the said wagon is adaptable for children's use, especially in coasting service.

What is claimed is:

The combination of a wagon tongue having an outer tubular portion, a stem adjustably telescoped in the tubular portion, a handle at one end of the stem opposed elongated slots extending in a direction transversely of the stem and located inwardly of the other end of the stem, opposed openings located near the outer end of the tongue, opposed openings located inwardly of the tongue remote from the aforesaid opposed openings and a split springy ring member having a latching pin thereon adapted to register with said slots and either of said located opposed openings to adjustably latch the stem in several positions and to permit slight turning movements of said stem within said tongue.

JOSEPH RUDOLPH McCRAY.